United States Patent
Toshioka et al.

[15] 3,652,985
[45] Mar. 28, 1972

[54] ALARM SYSTEM FOR VEHICLE HYDRAULIC PRESSURE CIRCUIT

[72] Inventors: Toru Toshioka; Toshinobu Kuroyama, both of Toyota, Japan

[73] Assignee: Toyota Jidosha Kogyo Kabushiki Kaisha, Toyota, Aichi, Japan

[22] Filed: Aug. 5, 1970

[21] Appl. No.: 61,046

[30] Foreign Application Priority Data

Aug. 6, 1969 Japan..................................44/61943
Sept. 23, 1969 Japan..................................44/75457

[52] U.S. Cl. ............................................340/60, 340/52 C
[51] Int. Cl. .....................................................G08b 21/00
[58] Field of Search ....................340/52, 52 C, 22 F, 60, 240; 200/81

[56] References Cited

UNITED STATES PATENTS 3,454,925  7/1969  Ruof..................................340/52 X Primary Examiner—Alvin H. Waring
Attorney—Connolly and Hutz

[57] ABSTRACT

Alarm system for hydraulic pressure circuit provides warning regarding functional deterioration or failure in hydraulic pressure circuit such as oil pressure circuit of hydraulic brake system of vehicle. System comprises pulse generator for periodically obtaining hydraulic pressure pulses representative of pressure in hydraulic pressure circuit. Pressure converter located in hydraulic pressure circuit changes hydraulic pressure pulses into electric pulses, and detecting circuit detects difference between waveform of electric pulses obtained by pressure converter and waveform of electric pulses representative of pressure in hydraulic pressure circuit when circuit is normal. Alarm device connected to detecting circuit is energized when waveform of electric pulses from pressure converter differs from waveform of electric pulses representative of pressure in hydraulic pressure circuit when circuit is normal.

4 Claims, 11 Drawing Figures

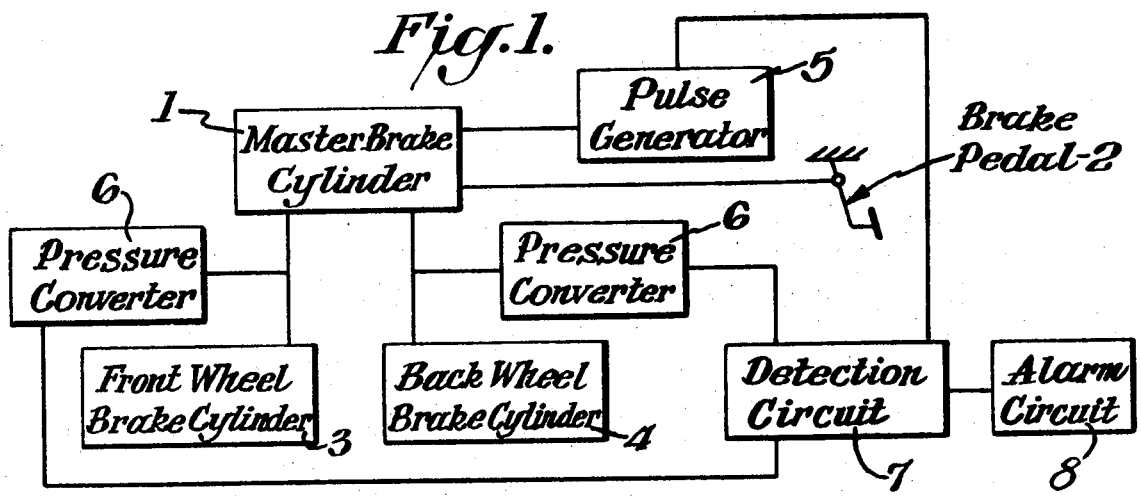
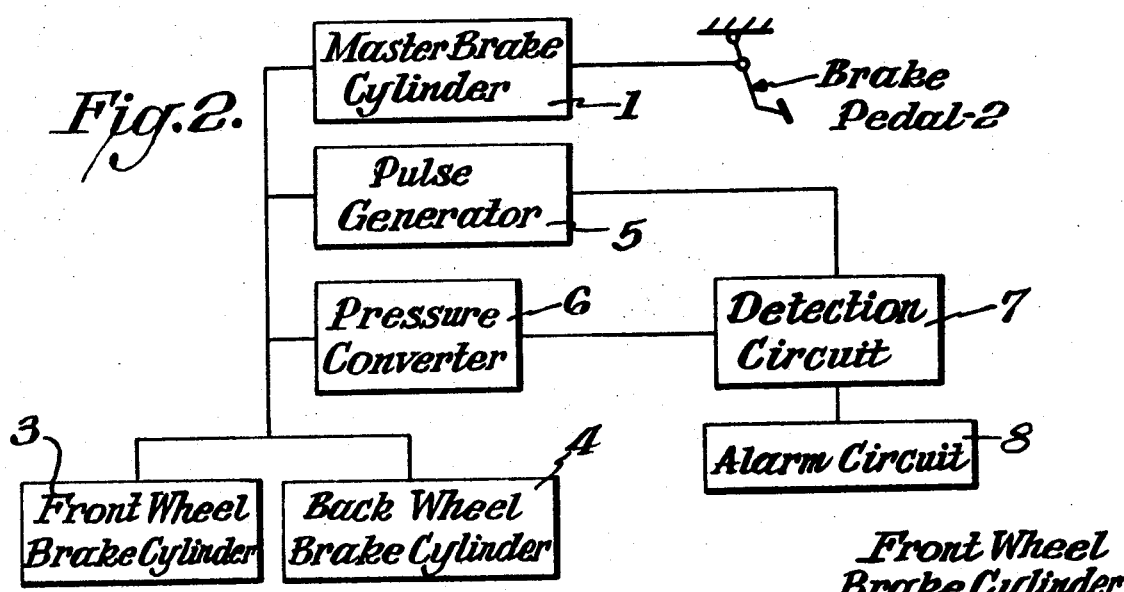
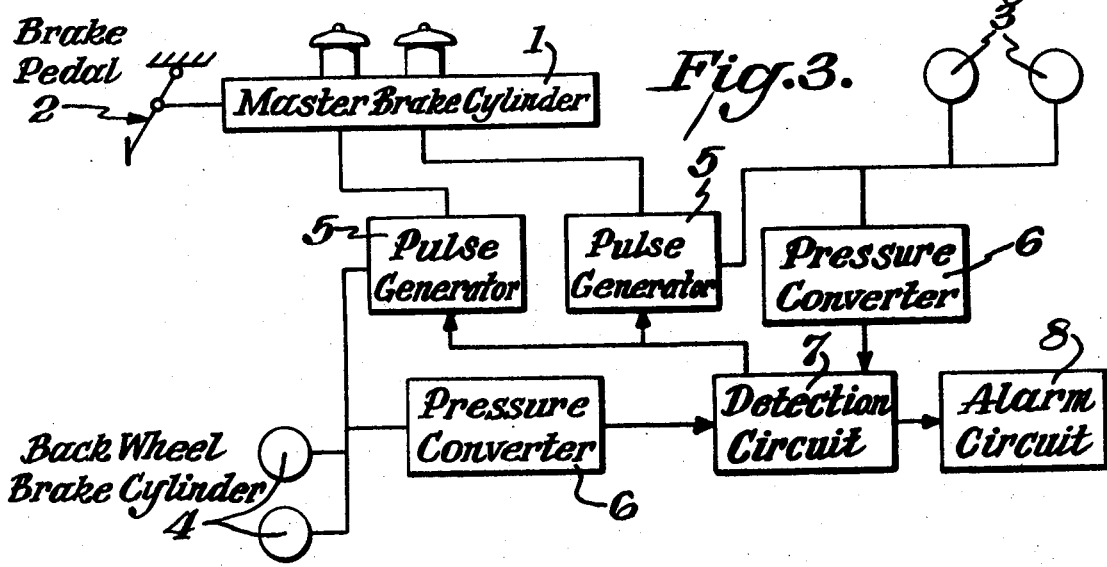

3,652,985

ALARM SYSTEM FOR VEHICLE HYDRAULIC PRESSURE CIRCUIT

BACKGROUND OF THE INVENTION

The present invention relates to an alarm system for hydraulic pressure circuits.

Devices are known for issuing a warning about failures of vehicle braking systems by utilizing the oil pressure change in the brake operation. These devices have the drawback in that failure cannot be detected until the brake operation is begun, and this is next to meaningless for the purpose of alarm. In recent times, express highways for automobiles are commonplace and automobiles operate at extremely high speeds. Under these conditions, imperfect brake operation often leads to fatal accidents. Meanwhile, an increased density of automobiles causes traffic congestion which makes applications of the brake increasingly frequent. Thus, brake equipment wears out sooner than expected. It is necessary that the driver be aware of brake failure at all times. From this standpoint, development of an effective alarm is strongly in demand.

SUMMARY OF THE INVENTION

The primary object of the present invention is to generate and measure a signal which is representative of the hydraulic pressure in a hydraulic pressure circuit and thereby detect a failure in the circuit as soon as it occurs.

A hydraulic pulse is given to a hydraulic mechanism, for instance, the oil pressure circuit of the hydraulic braking system of a running automobile, periodically, say, every 5 minutes or non-periodically. The hydraulic pulse is converted to an electric pulse and any change in the waveform thereof due to functional deterioration or failure of the circuit is detected and the driver is warned of the change.

BRIEF DESCRIPTION OF THE DRAWING

Novel features and advantages of the present invention in addition to those mentioned above will become apparent to those skilled in the art from a reading of the following detailed description in conjunction with the accompanying drawings wherein:

FIG. 1 is a hydraulic circuit diagram of a double brake system;

FIG. 2 is a hydraulic circuit diagram of a single brake system;

FIG. 3 is a hydraulic circuit diagram of a double brake system added with two pulse generators according to the present invention;

DETAILED DESCRIPTION OF THE INVENTION

Figure 4:
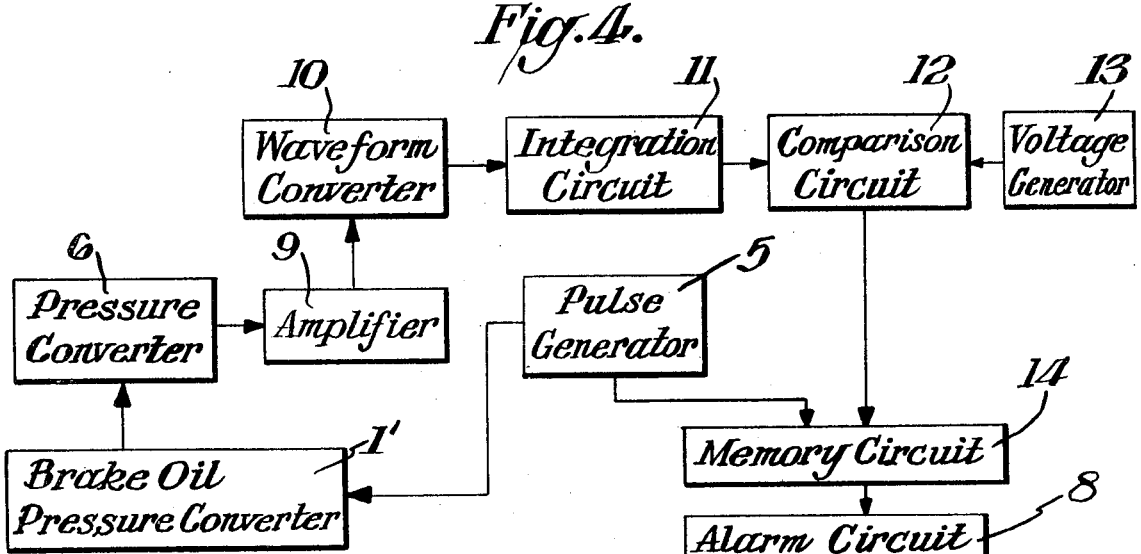
FIG. 4 and FIG. 6 are block diagrams showing the details of the detecting circuits of FIGS. 1 and 2.

Referring in more particularity to the drawing, FIG. 1 illustrates a double brake system for an automobile wherein the oil pressure in the master brake cylinder 1 is transmitted by the brake pedal 2 to the front wheel brake cylinder 3 and the back wheel brake cylinder 4 to operate the brakes. FIG. 2 illustrates the case of a single system brake cylinder wherein the oil pressure in the master brake cylinder 1 is separately transmitted by the brake pedal 2 to the front wheel brake cylinder 3 and the back wheel brake cylinder 4.

The pulse generator in FIG. 1 which transmits the hydraulic pulse causes the piston in the master brake cylinder 1 to act independently of the brake pedal 2 thereby generating a hydraulic pulse in the brake circuit. There are different types of pulse generators. One type consists of an electric pulse generator and a magnet. Another utilizes the negative pressure of the engine. A third is a mechanical one using cams and springs. Still another comprises a combination of these elements. In FIG. 2, the pulse generator 5 constitutes an independent oil pressure pump which generates a constant pulse in the brake circuit.

The hydraulic pulse generator which renders this invention notably effective is described below.

Figure 6:
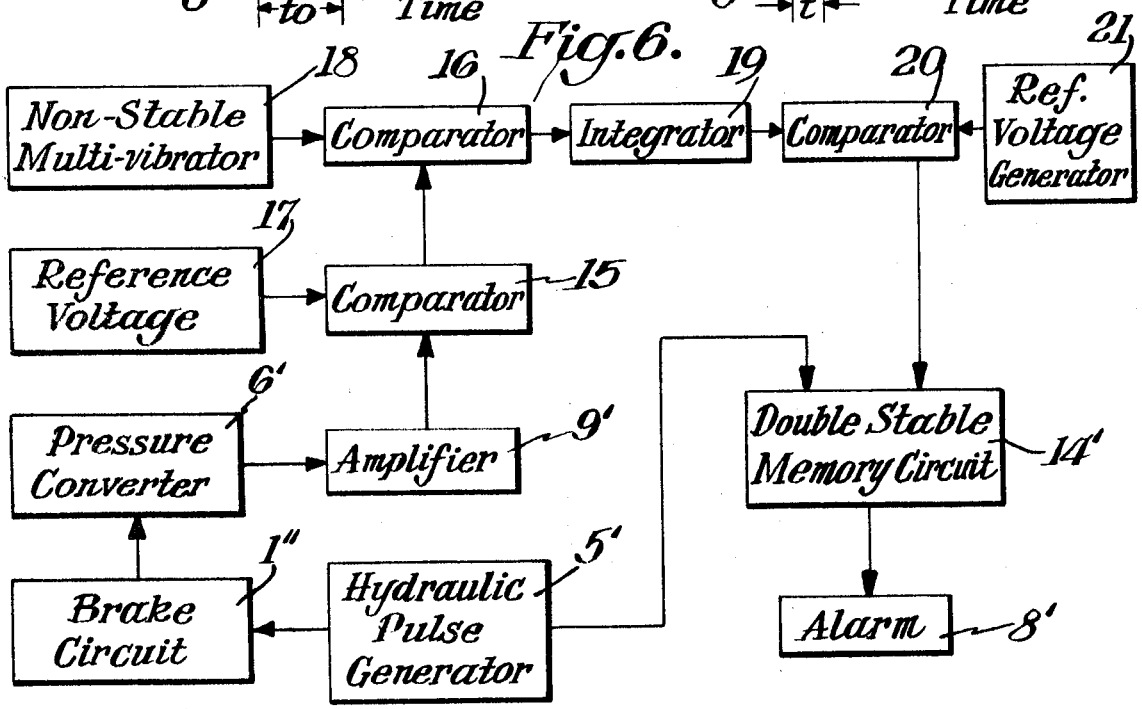

In FIGS. 1 and 2, 6 is a pressure converter which converts the oil pressure signal to an electric one. A piezoelectric element, a resistance wire strain gauge, or a pressure-sensing diode may be employed for this converter. Next, 7 is a detecting circuit which detects leakage of brake oil. As described in detail below, the detecting circuit is composed of several devices. The above-mentioned pressure converter 6 is connected via the detecting circuit 7 to an alarm circuit 8.

FIG. 3 illustrates an arrangement very similar to the embodiment shown in FIG. 1. Two hydraulic pulse generators 5,5 are connected in parallel between a tandem master brake cylinder 1 and the detecting circuit 7.

FIG. 4 illustrates a circuit for FIGS. 1, 2, and particularly indicates the details of the detecting circuit 7. A brake oil pressure circuit 1' leads from the master brake cylinder 1 of FIGS. 1 and 2 to the wheel brake cylinder 3. The oil pressure is changed by the pressure converter 6 to an electric signal. Item 9 is an amplifier to amplify the analog quantity obtained in the brake oil pressure circuit 1'. A waveform converter 10 is provided for transforming the signal waveform from the pressure converter 6 into a waveform of a constant voltage. An integration circuit 11 transmits a voltage equivalent to the area of this waveform to the succeeding stage. A comparison circuit 12 compares the signal voltage from the pressure converter 6 with the voltage given by a reference voltage generator 13 and transmits a signal voltage only when the signal voltage of the pressure converter 6 exceeds the reference voltage. A double stable memory circuit 14 is set by the signal from the hydraulic pulse generator 5 and is reset by the pulse from the comparison circuit 12 when the brake functions normally. It is not reset if the brake is not normal and accordingly no pulse is generated by the comparison circuit 12 thereby causing the alarm 8 to sound.

Figure 5A:
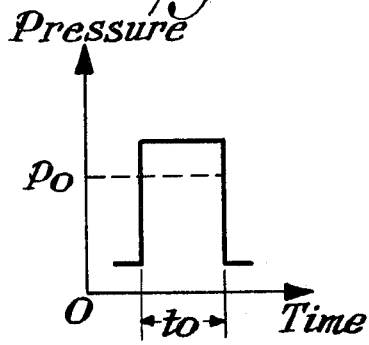
FIG. 5a and FIG. 5b show the hydraulic pulse waveforms when the oil pressure circuit is functioning normally and when it is leaking.
Figure 5B:
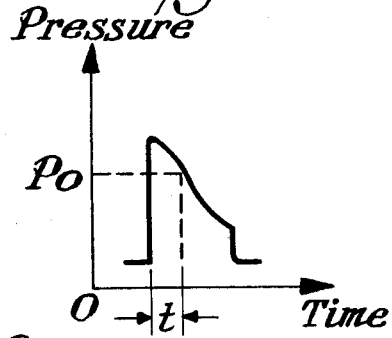

FIGS. 5a, 5b illustrate hydraulic pulse waveforms, the ordinate indicating the pressure and the abscissa indicating the time. The normal hydraulic pulse as shown in FIG. 5a turns into the pulse as shown in FIG. 5b when oil leaks from the brake circuit. Namely, the signal waveform from the pressure converter 6 is kept rectangular as in FIG. 5a by the waveform converter 10, but under oil leakage it changes to one as shown in FIG. 5b and the time during which the pressure is held over $P_o$ changes from $t_o$ to $t$.

FIG. 6 is a diagram showing a detecting circuit comprising a gate circuit and a multi-vibrator. In the same manner as in FIG. 4, the pulse generated by the hydraulic pulse generator 5' is converted to an electric signal by the pressure converter 6' in the brake circuit 1''.

Figure 7:
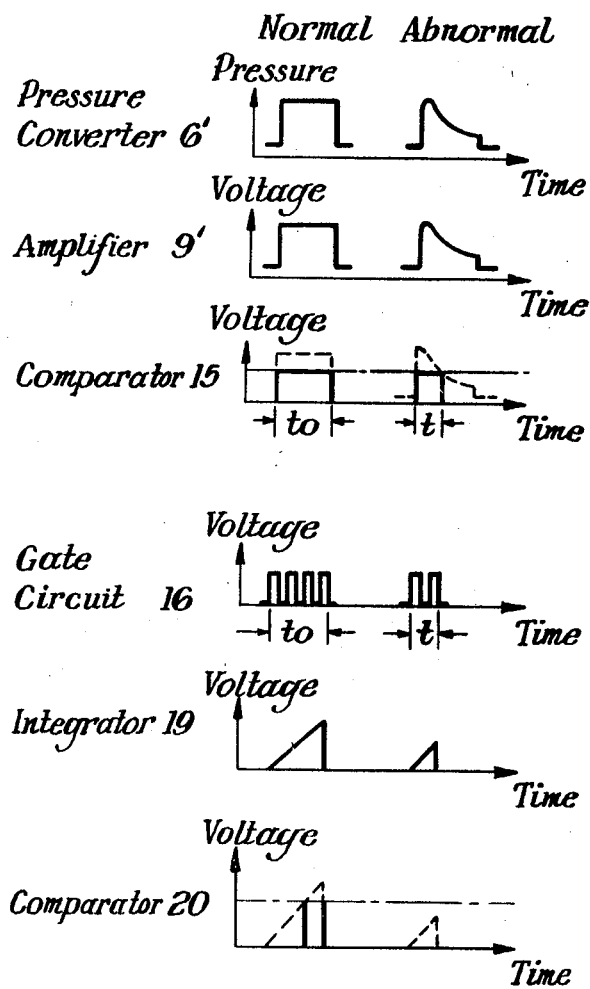
FIG. 7 shows the waveform of the circuit of FIG. 6.

As shown in FIG. 7, the signal waveform amplified by the amplifier 9' is introduced into the comparator 15 where the waveform distortion is converted to a difference in pulse width for controlling the timing for opening the gate in the gate circuit 16. Reference numeral 17 is the reference voltage of the comparator 15. The output from a non-stable multi-vibrator 18 is supplied to the integrator 19 only while the gate of the gate circuit 16 remains open. Therefore, the number of pulses going to the integrator 19 depends upon the distortion in the hydraulic pulse waveform. The integrator 19 transforms the difference in the pulse number into a difference in voltage which is transmitted to the comparator 20. In the comparator 20, the voltage from the integrator 19 is compared with the reference voltage set by the reference voltage generator 21. A pulse is sent to the double stable memory circuit 14' of the succeeding stage only when the reference voltage is exceeded by the input. The double stable memory circuit 14', just as in FIG. 4, is set by a signal from the hydraulic pulse generator 5' and is reset by a pulse from the comparator 20 as long as the brake functions normally. When the brake is out of order, however, the comparator 20 fails to give a pulse whereby the circuit 14' is not reset and the alarm 8' sounds.

Figure 8:
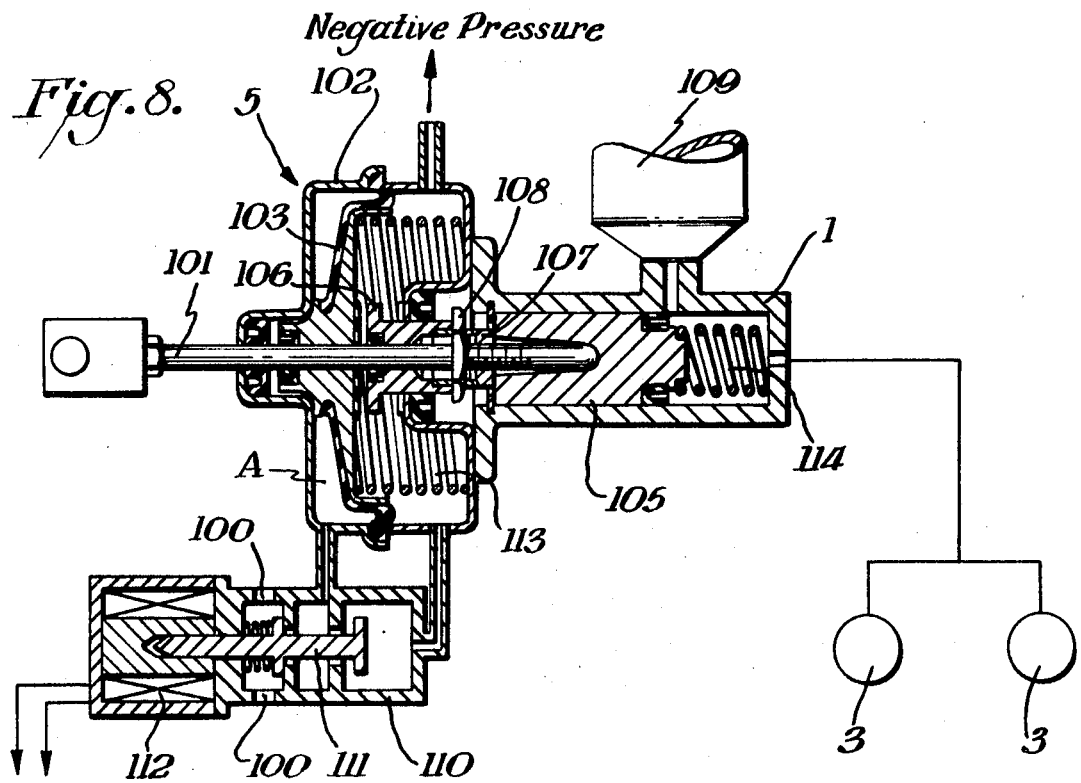
FIG. 8 is a longitudinal section of one embodiment of the pulse generator according to the present invention.

FIG. 8 illustrates a hydraulic brake partially utilizing a master brake cylinder. The system includes master brake cylinder 1, a piston push rod 101, a piston 105, a brake oil reservoir 109, and a wheel cylinder 3. A magnet 112 is connected to an oscillation circuit. Three chambers, i.e., the normally negative pressure chamber, the normally atmospheric pressure chamber and the chamber which changes from negative to atmospheric pressure under pulse generation are provided. A negative pressure controller 110 appropriately connects these chambers by means of a valve 111. The negative pressure cylinder 102 is divided by the negative pressure piston 103 into two chambers in the moving direction of the piston 105 of the master brake cylinder 1. One chamber on the side of the master brake cylinder 1 is connected to the engine intake manifold and has a negative pressure. The other chamber A communicates through the negative pressure control valve 110 to the former chamber and also has a negative pressure.

Item 107 is a stroke-adjusting screw for the lock nut 108. By normal brake operation the piston push rod 101 coupled to the brake pedal, independently of the negative pressure piston 103 or the pressure application sleeve 106, pushes the piston 105 of the master brake cylinder 1 and the brake is applied. With cessation of this operation, the action of the spring 114 in the master brake cylinder 1 restores the condition of FIG. 8. To give a hydraulic pressure to the hydraulic circuit for the brake alarm, the magnet 112 is energized by an electric pulse from the oscillation circuit (not shown). Thereby, the magnet 112 attracts the valve 111 of the negative pressure controller 110. At the same time the atmospheric pressure goes through the partition hole 100 located to the left of the negative pressure controller 110, as indicated in FIG. 8, to the chamber A not connected to the engine intake manifold. Under the action of the negative pressure piston 103, due to the atmospheric pressure difference, the lock nut 108 is pushed via the pressure application sleeve 106 and the piston 105 acts. Thus, a hydraulic pulse of certain magnitude is generated. When the electric pulse ceases, the valve 111, the negative pressure piston 103, and the piston 105 under action of respective springs, return to the condition of FIG. 8 If the brake is operated at t he same time as the generation of a hydraulic pulse the stroke of the piston 105 being pushed by the pressure application sleeve 106 becomes smaller than the stroke of it being pushed by the push rod 101 and accordingly the ordinary brake operation is not hampered.

Figure 9:
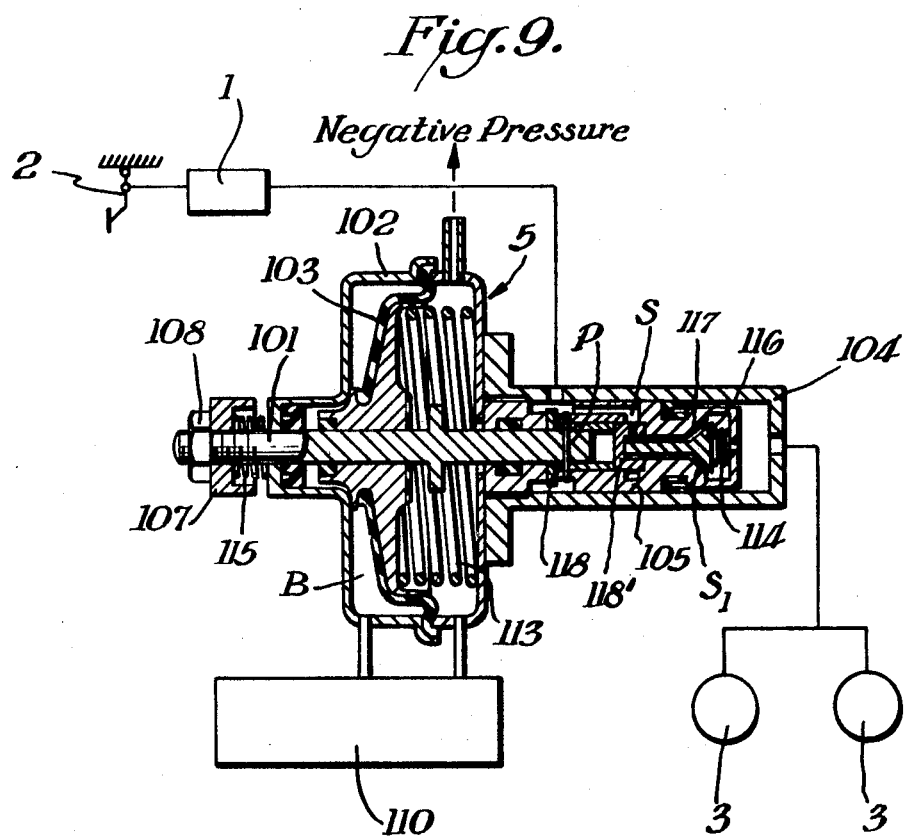
FIG. 9 is a longitudinal section of another embodiment of the pulse generator according to the present invention.

FIG. 9 also illustrates a hydraulic brake in which a hydraulic pulse generator 5 is provided in the oil pressure circuit extending from the master brake cylinder 1 to the wheel cylinder 3. A hydraulic cylinder 104 is connected to the hydraulic circuit. Also included is a hydraulic piston 105 with a hydraulic piston valve 116. A negative pressure cylinder 102 approximately the same as the one of FIG. 8 is also provided. The negative pressure controller 110 is the same as the one illustrated in FIG. 8 and operates in the same manner. When the brake pedal 2 is depressed for ordinary brake operation the master brake cylinder 1 supplies an oil pressure which passes through the gap S in the hydraulic piston 105 and through the gap $S_1$ between the hydraulic piston 105 held open by the valve guides 118, 118' and the valve 116, and thereby the wheel cylinder 3 applies the braking action. Thus, presence of an oil pressure pump in the hydraulic circuit does not hinder the brake operation.

The action of the hydraulic pulse generator is as follows. An electric pulse from the oscillation circuit actuates the negative pressure controller 110 to bring the chamber B up to atmospheric pressure. Thereupon, the negative pressure piston 103 pushes via the piston push rod 101 and the pin P, the hydraulic piston 105. The valve guides 118, 118' sticking to the hydraulic cylinder 104 do not shift and accordingly the moving direction of the piston push rod 101 and the hydraulic piston 105 is maintained. With a slight displacement of the hydraulic piston 105, the restraint of the valve guide 118' on the hydraulic piston valve 16 is lifted, the open condition is removed, and under the force of the spring 114 the hydraulic piston valve 116 is pressed against the surface 117 of the hydraulic piston 105 to bring about a closed state.

This displacement of the hydraulic piston 105 is accompanied by generation of a hydraulic pulse of certain magnitude in the hydraulic circuit. Then, as the initial electric pulse diminishes, the piston push rod 101 and the negative pressure piston 103 under action of respective springs 115, 113 revert to the open state as shown. In this state the hydraulic piston valve 116 is again pressed against the valve guide 118' to contract the spring 114 and create a gap $S_1$ relative to the surface 117 of the hydraulic piston 105. Now the condition is ready for normal brake operation. The piston push rod 101 cannot be displaced beyond a certain limit because of the location of the lock nut 108. Adjustment within this limit is accomplished by means of the stroke adjusting screw 107.

If brake operation is made simultaneously with hydraulic pulse generation, the oil pressure under brake operation is naturally higher than the pressure of hydraulic pulse even when the piston 105 is moving and the hydraulic piston valve 116 is in a closed state. Therefore, the hydraulic piston 105 closes the hydraulic piston valve 116. Hence, the ordinary brake operation can take place without hindrance.

Figure 10:
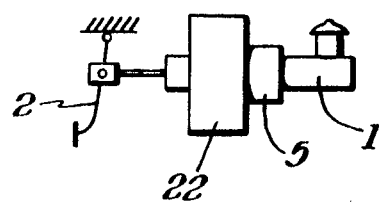
FIG. 10 is a diagrammatical view of the pulse generator of FIG. 8 coupled with a negative pressure brake force multiplier.

FIG. 10 shows the pulse generator 5 of FIG. 8 coupled to a negative pressure brake force multiplier 22 in which a slight stepping-on of the brake pedal 2 suffices to exert a strong brake action on the wheel cylinder.

As described above, the present invention gives a periodic or non-periodic hydraulic pulse to the brake oil pressure circuit of an operating automobile to thereby check the brake performance at all times. Therefore, the effect of this invention is that as soon as a failure occurs in the brake oil pressure circuit, the driver can sense it and take necessary steps before operating the brake thereby averting a possible accident. The application of this invention is not limited to the brake apparatus. Instead, it can be effectively extended to various hydraulic apparatus for detection of oil leakage or water leakage in radiators.

What is claimed is:

1. An alarm system for a hydraulic pressure circuit comprising at least one pulse generator for periodically obtaining hydraulic pulses representative of the pressure in the hydraulic pressure circuit, a pressure converter in the hydraulic pressure circuit for converting the hydraulic pulses to electric pulses, a detecting circuit for detecting a difference between the waveform of the electric pulses obtained by the pressure converter and the waveform of electric pulses representative of the pressure in the hydraulic pressure circuit when the circuit is normal, and an alarm connected to the detecting circuit energized by the circuit when the waveform of electric pulses from the pressure converter differs from the waveform of electric pulses representative of the pressure in the hydraulic pressure circuit when the latter is normal.

2. An alarm system as in claim 1 in combination with a hydraulic pressure circuit that includes a master brake cylinder, an individual brake wheel cylinder, and a line interconnecting the master brake cylinder and the individual brake cylinder.

3. An alarm system as in claim 1 wherein the pulse generator comprises a cylinder with a flexible diaphragm that divides the cylinder into first and second chambers, a first line connecting the first chamber to a source of negative pressure, a second line interconnecting the two chambers, a valve in the second line having an open position to provide communication between the chambers and a closed position to separate the chambers, a vent associated with the valve for venting the second chamber when the valve is closed whereby the flexible diaphragm is urged in the direction of the first chamber when the valve is closed, control means to periodically open and close the valve, and a piston in the hydraulic pressure circuit for generating hydraulic pulses with means interconnecting the flexible diaphragm and the piston whereby hydraulic pulses are generated when the control means closes the valve and the flexible diaphragm is urged in the direction of the first chamber to thereby urge the piston in the same direction.

4. An alarm system as in claim 3 wherein the piston in the hydraulic pressure circuit is associated with the master brake cylinder of a vehicle braking system.

* * * * *